US008610832B2

(12) United States Patent
Frerking

(10) Patent No.: US 8,610,832 B2
(45) Date of Patent: Dec. 17, 2013

(54) SYSTEM AND METHOD FOR BROADCAST STATION ADJACENCY

(75) Inventor: Melvin Frerking, Norcross, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 1009 days.

(21) Appl. No.: 12/642,189

(22) Filed: Dec. 18, 2009

(65) Prior Publication Data

US 2011/0149168 A1 Jun. 23, 2011

(51) Int. Cl.
*H04N 5/38* (2006.01)
*H04N 5/00* (2011.01)

(52) U.S. Cl.
USPC ............. 348/723; 348/729; 348/21; 348/553; 348/725; 455/129; 343/751

(58) Field of Classification Search
USPC ............ 348/723, 729, 21, 553, 725; 455/129, 455/279.1; 343/751, 777, 853
See application file for complete search history.

(56) References Cited

U.S. PATENT DOCUMENTS

| | | | |
|---|---|---|---|
| 5,809,395 A * | 9/1998 | Hamilton-Piercy et al. .. 725/106 |
| 6,697,641 B1 | 2/2004 | Shapira |
| 6,944,139 B1 | 9/2005 | Campanella |
| 7,050,758 B2 | 5/2006 | Dalgleish et al. |
| 7,376,180 B2 | 5/2008 | Feher |
| 2006/0014491 A1 | 1/2006 | Cleveland |
| 2006/0030262 A1 | 2/2006 | Anderson et al. |
| 2006/0264174 A1 | 11/2006 | Moss |

* cited by examiner

*Primary Examiner* — Jefferey Harold
*Assistant Examiner* — Jean W Desir

(57) ABSTRACT

Disclosed herein are systems, methods, and computer-readable storage media for broadcasting signals. The system includes a supplemental antenna at a first location co-located with a main antenna transmitting a main signal. The supplemental antenna is physically separate from a main antenna at the same location and transmits a supplementary signal adjacent to the main signal which matches or corresponds to a remote signal transmitted from an antenna at a remote location. The system transmits the supplemental signal at sufficient power to overcome interference in a coverage hole of the remote signal caused by the main signal. A supplemental antenna co-located with the main antenna can transmit the supplemental signal. The system can receive a supplemental signal that matches a remote signal, pass the supplemental signal through a same power amplifier and filter as a local main signal, and broadcast via an antenna both the main signal and the supplemental signal.

20 Claims, 8 Drawing Sheets

SYSTEM AND METHOD FOR BROADCAST STATION ADJACENCY

BACKGROUND

1. Technical Field

The present disclosure relates to wireless transmissions and more specifically to supplemental signal transmissions within a coverage hole caused by transmission signal interference between a strong local signal and a weak remotely transmitted signal.

2. Introduction

Currently broadcast stations, such as television transmitters, can only share adjacent channel allocations if they are co-located. For example, assume that a first TV station broadcasts a first channel or signal from an antenna located on tower A of FIG. 2 and a second TV station broadcasts a second channel from an antenna on tower A. When two transmitters are co-located in this fashion, the signal strengths of each transmitted signal decline more or less equally with distance away from the transmitter. Receivers such as television antennas are able to distinguish between the two channels when their relative signal strengths at the receiver are equal or approximately equal.

A problem can occur however if two transmission antennas are not co-located. Many markets have the configuration set forth in FIG. 2 in which an antenna on tower A transmits a first channel and an antenna on tower B transmits a second channel. In this case, the signal strength of the signal transmitted from tower A in a near field region around tower A is much greater than the signal strength of the signal transmitted from tower B. FIG. 2 shows a delineated area 208 in which a "coverage hole" occurs. In area 208, a receiver such as receiver 516 at point F has difficulty in receiving the signal from tower B because the signal from tower A is much stronger and interferes with the tower B signal. A similar coverage hole occurs around tower B as shown by area 206. In this area, the signal transmitted from tower A is much weaker and thus difficult for a receiver 518 at position G to receive.

The existence of coverage holes is especially pronounced with adjacent channels in which the frequency of one channel is near the frequency used by the other channel. This interference is shown by way of example in FIG. 3 in which a graph 300 illustrates the frequency/power graph for a signal 302 transmitted from tower A as channel A and an adjacent signal 304 transmitted from tower B on channel B. The interference shown in graph 300 applies to signals in region 206 of FIG. 2. The signal 302 is the weaker signal in the region 206 because its transmission antenna is remote and on tower A. In region 206, channel B (transmitted by tower B) is a stronger signal since its transmission tower B is local. Thus, a receiving device 518 at position G in region 206 would have difficulty receiving the signal 302 broadcast on channel A from remote tower A due to the interference caused by the close proximity and signal strength of signal 304 from tower B. Channel A and B in FIG. 3 are shown as being adjacent to each other which further causes interference between the two channels.

Channels are specific frequency bands, such as a 6 MHz wide allocation between 174 MHz and 180 MHz assigned to channel 7, for example. Transmitters can transmit one or more signals on a particular channel. A receiving station receives and processes the signal to produce an audio program, text, television program, and/or some other form of data. Analog televisions channels are typically 6, 7 or 8 MHz in bandwidth.

One attempt to reduce the interference between channels includes allocating a guard band or channel between the two adjacent channels. Guard bands are used both for terrestrial based communication and satellite communication. Such a guard band would not be needed for adjacent channels if both adjacent channels were transmitted at the same power and height from the same location. However, when adjacent channels are transmitted from different locations, then a guard band is required to enable reception of unrelated channels. FIG. 4 illustrates 400 the use of the guard band in between channels A and B. While this provides some benefit to reducing inter-channel interference, the use of such a guard channel wastes valuable space in the spectrum. For example, if the tower configuration shown in FIG. 2 were deployed to a city, then the available stations for that city may be limited to every other channel. In other words, the Federal Communications Commission (FCC) may allocate channels 2, 4, 6, 8, 10 and so forth. The guard bands allocated by the FCC are represented by channels 3, 5, 7, 9, etc. and prevent the interference between the channels. As can be seen, as more channels are provided in a market, more guard bands and thus more wasted spectrum must be allocated.

What is needed in the art is a new approach that eliminates the coverage holes near transmission towers and frees up additional spectrum because of the allocation of guard channels.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
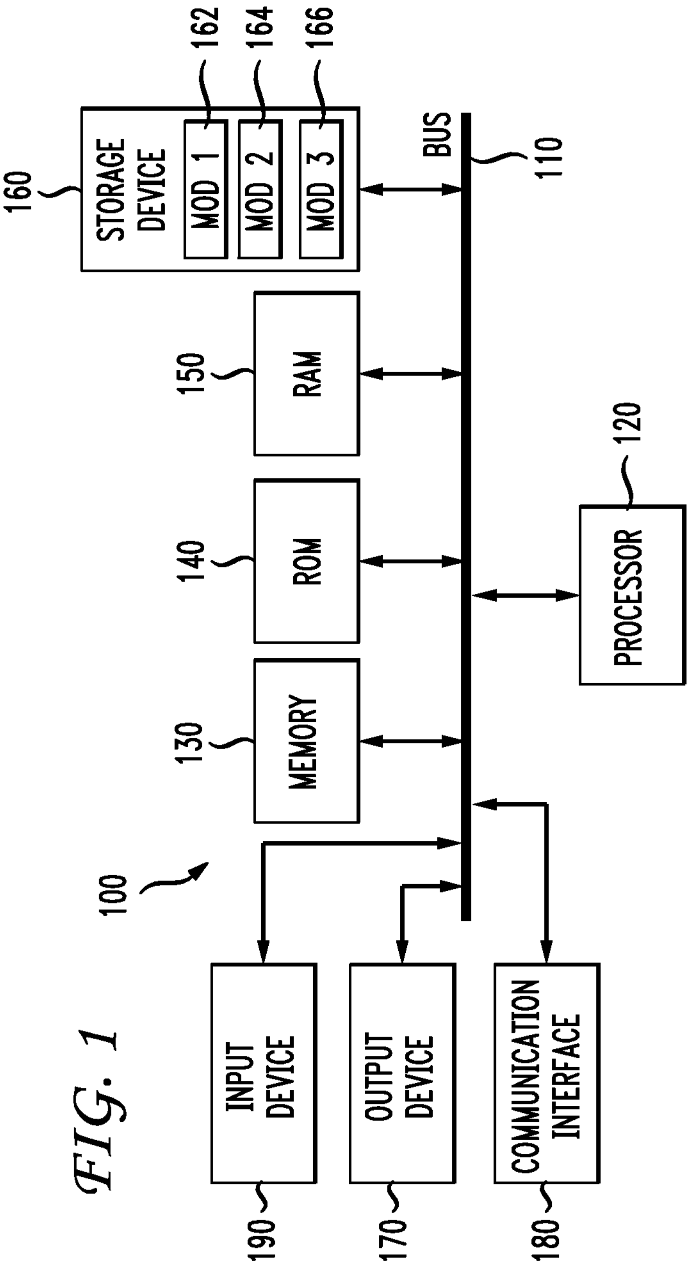
FIG. 1 illustrates an example system embodiment.
Figure 2:
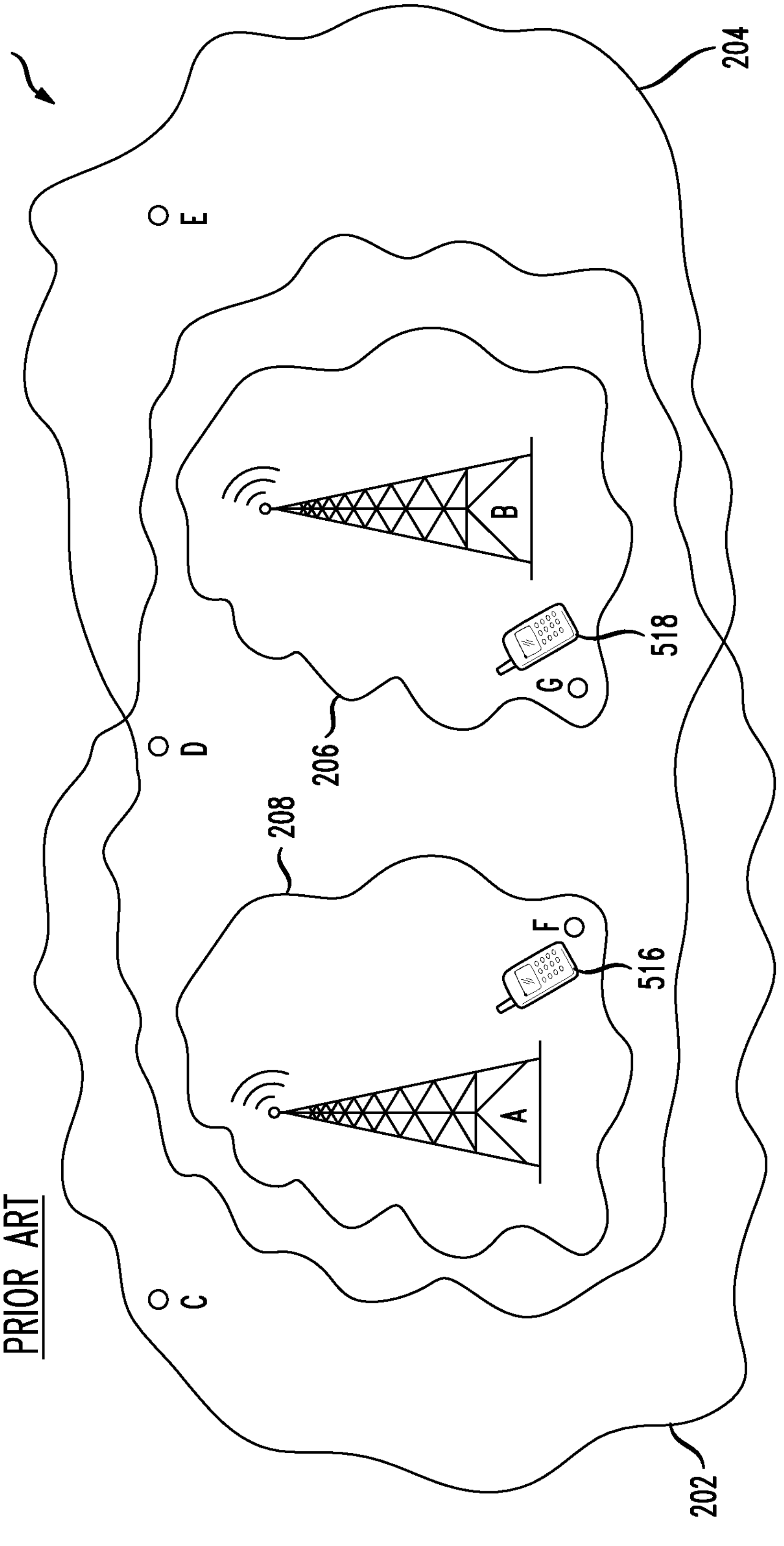
FIG. 2 PRIOR ART
FIG. 2 illustrates a prior art interference of frequencies between two adjacent channels.
Figure 3:
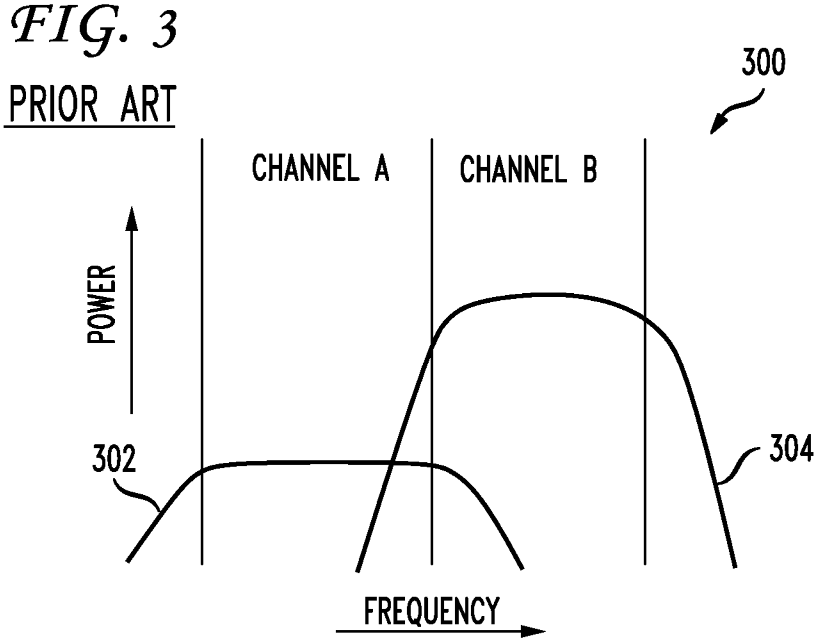
FIG. 3 PRIOR ART
FIG. 3 illustrates interference between channel A and channel B.
Figure 4:
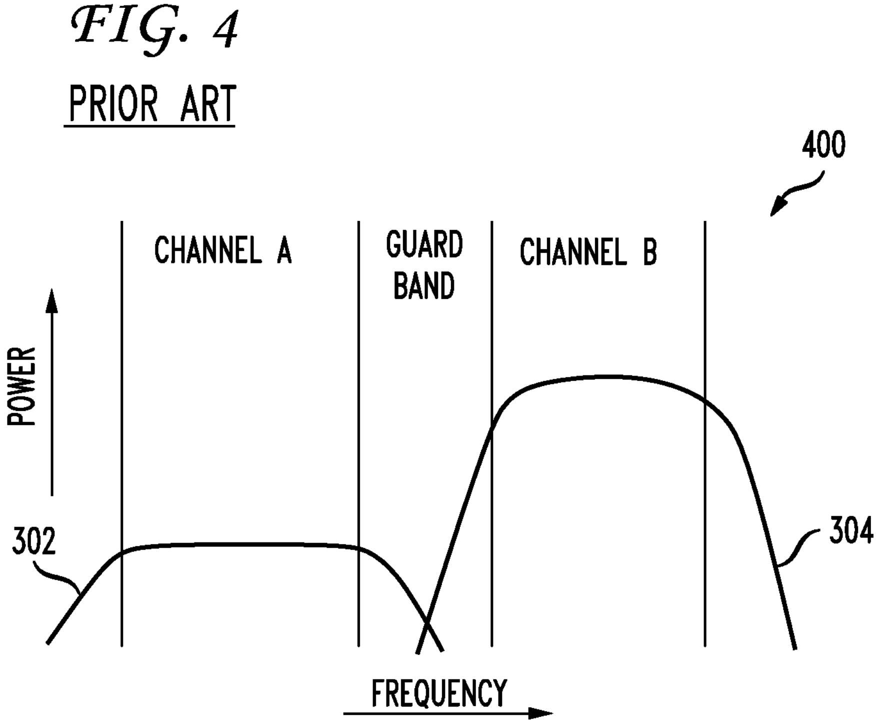
FIG. 4 PRIOR ART
FIG. 4 illustrates the allocation of a guard channel between channel A and channel B.

FIG. 1 illustrates an example computing device which can be used in various ways within the various embodiments of the invention. The details of this FIG. 1 are discussed more fully following the discussion of the specific features of the various embodiments.

The system, method and computer-readable media embodiments of this disclosure address the issues raised in the art. This disclosure introduces concepts that can eliminate the coverage holes around transmission towers as well as eliminating the need for guard bands which waste important spectrum. As would be understood by one of skill in the art, with the increased use of wireless communication devices and an ever-increasing flow of data over wireless networks, there is an increasing need for additional spectrum to accommodate the consumer demand. This disclosure shall explain how the transmission of an auxiliary signal from a local tower can eliminate the coverage hole around that tower without the need of a guard band and thus address the issues in the art. Two primary embodiments are disclosed herein. A first embodiment includes broadcasts both a main signal and a supplemental signal from the same common antenna. This approach is shown can be accomplished in a number of different ways with respect to amplification and filtering as shall be discussed below. A second embodiment includes adding a separate antenna for transmitting a supplementary signal in additional to a main signal at a particular location where a coverage hole exists. In this embodiment, a main antenna transmits a main signal and an auxiliary antenna transmits the supplementary signal. Additional auxiliary antennas may also be added as well to transmit additional supplementary signals.

Figure 5:
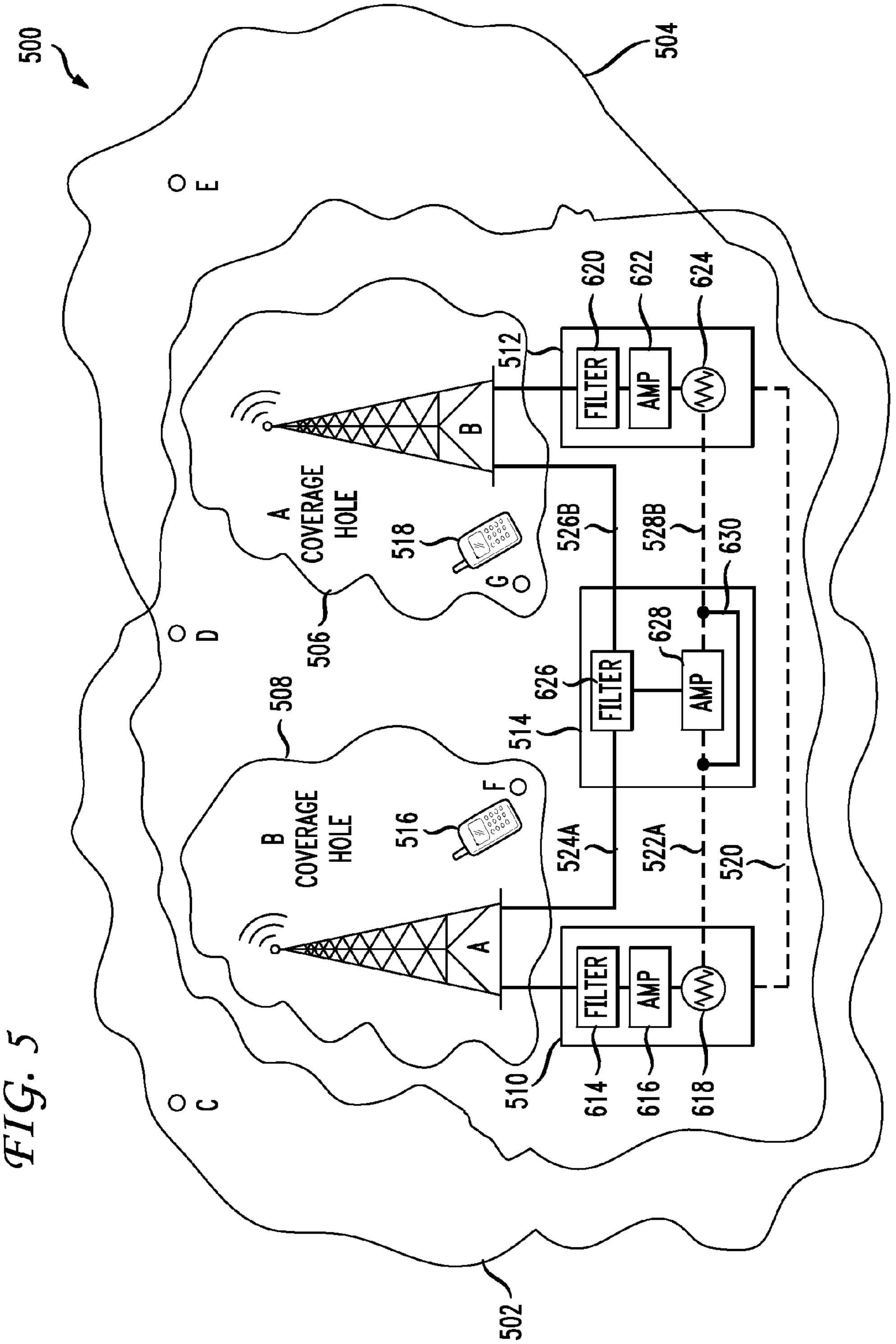
FIG. 5 illustrates an example broadcast coverage map.

FIG. 5 illustrates the antenna radiation patterns of a tower A and a tower B. A broadcast coverage map 500 shows the patterns for signals transmitted from tower A and tower B. Transmitter A broadcasts to a surrounding coverage area 502 and transmitter B broadcasts to a surrounding coverage area 504. At different reception points, different reception patterns appear. For example, a receiver (not shown) at point C receives signals from transmitter A. A receiver (not shown) at point D receives signals from both transmitter A and B. A receiver (not shown) at point E receives signals from transmitter B. A receiver 516 at point F only receives signals from transmitter A because the power of signals from transmitter A is greater than signals transmitted from tower B due to positions F close proximity to tower A. Likewise, a receiver 518 at point G only receives signals from transmitter B because of the relative power of the signal received from transmitter B vis-à-vis the signal received from tower A. The competing A and B transmitters create respective coverage holes 506, 508 in a near field region surrounding tower A and tower B. The solution to the coverage hole problem includes the addition of an auxiliary lower power signal transmitted from a same location of the high power signal on a physically separate antenna from the primary signal transmitted from the tower. In an alternate approach as shall be discussed below, a single antenna can transmit both the main and the supplemental signal. In this scenario, the main power transmitter, filter and antenna used for a main signal can also be fed with, process and transmit the auxiliary signal. Variations on this also can be applied. For example, separate amplifiers but the same filter may be used for the respective main signal and supplementary signal.

A description of the principles of the disclosure will first focus on the B coverage hole 508 surrounding tower A. A radio control unit 512 is associated with the generated signal at tower B. The control unit 512 generates the signal (channel B) that is transmitted from tower B as the main signal for channel B. The issue is how to enable the channel B signal transmitted from tower B to be detected by a receiving device 516 at point F in region 508 while at the same time freeing up additional spectrum. The receiving device 516 can be a television having an antenna, a phone, a radio, or any other device that can receive a signal transmitted through an air interface. The same fundamental principles can also extend coverage areas to fringe regions where the transmitted signal is too weak to be detected reliably.

In order for device 516 to receive channel B, the control module 512 communicates channel B to another control module 514. This module 514 includes the necessary hardware components such as an amplifier and a filter to transmit channel B to an antenna on tower A. The control unit 514 broadcasts via the antenna an auxiliary transmission signal at a lower power than channel B as broadcast from tower B. The result of transmitting a lower power version of channel B from tower A is to enable the receiving device 516: (1) to receive directly the auxiliary channel B when closer to tower A, or (2) as the device 516 nears the boundary around the coverage hole 508, to receive a boosted channel B as the auxiliary channel B and the main channel B interact and thus add together or (3) as the device is outside the boundary 508, to receive directly the main channel B transmitted from tower B since the signal strength of the main channel B is sufficiently strong outside the coverage hole. As shall be explained below with reference to FIG. 7, through applying this approach in a transmission system, the extra spectrum previously allocated to a guard band between two channels no longer becomes necessary. One or more auxiliary low power transmitters co-located with adjacent channel broadcast stations can operate in a single frequency network (SFN) configuration with a main transmitter in order to augment the desired signal to overcome adjacent channel interference issues.

Radio control unit 510 generates a signal delivered to the antenna on tower A which radiates the signal into the air interface. Similarly, control unit 512 generates the signal radiated by the antenna on tower B. The hardware components necessary to generate such signals are known to those of skill in the art. A general purpose computer or individual components of a computer such as a processor and memory as shown in FIG. 1 can be used as part of the control units. An additional radio control unit 514 is shown which communicates the transmitted signal from tower B through a transmission line to tower A for transmission from tower A as an auxiliary signal. Similarly, the control unit 514 can receive the channel A and transmit this channel to tower B for radiating a supplemental version of channel A from an antenna on tower B. The non-air interface transmission channel from tower B to tower A can be through any known or hereafter developed link such as the Internet, telephone system, cable system, and so forth. A satellite communication system, microwave communication system, point to point communication or any other system using an air interface can also be can also be applied as represented by dotted line 520 in FIG. 5 to communicate the channels from one tower to another. Control units 510, 512, 514 can include all or part of the equipment, software, and hardware necessary to generate or receive and transmit the signal, such as the antenna, feed lines, amplifiers, transmit filters etc. Similarly, the receiving devices 516, 518 that receive and process the signals have the known components such as an antenna, decoding processors, speakers, display devices, and so forth.

As an alternate to the use of a general purpose computer, however, the control units also include other known broadcast equipment such as power amplifiers, filters, and signal processing equipment known to those of skill in the art. For example, terrestrial television stations, granted licenses to use a particular portion of the radio spectrum, will utilize known equipment for generating and transmitting their signals. All such known equipment and any equipment hereinafter developed are considered part of the system that is disclosed herein. Such equipment according to the principles of this disclosure will be controlled and modified in its function to achieve the benefit of saving additional spectrum as disclosed herein.

Figure 6:
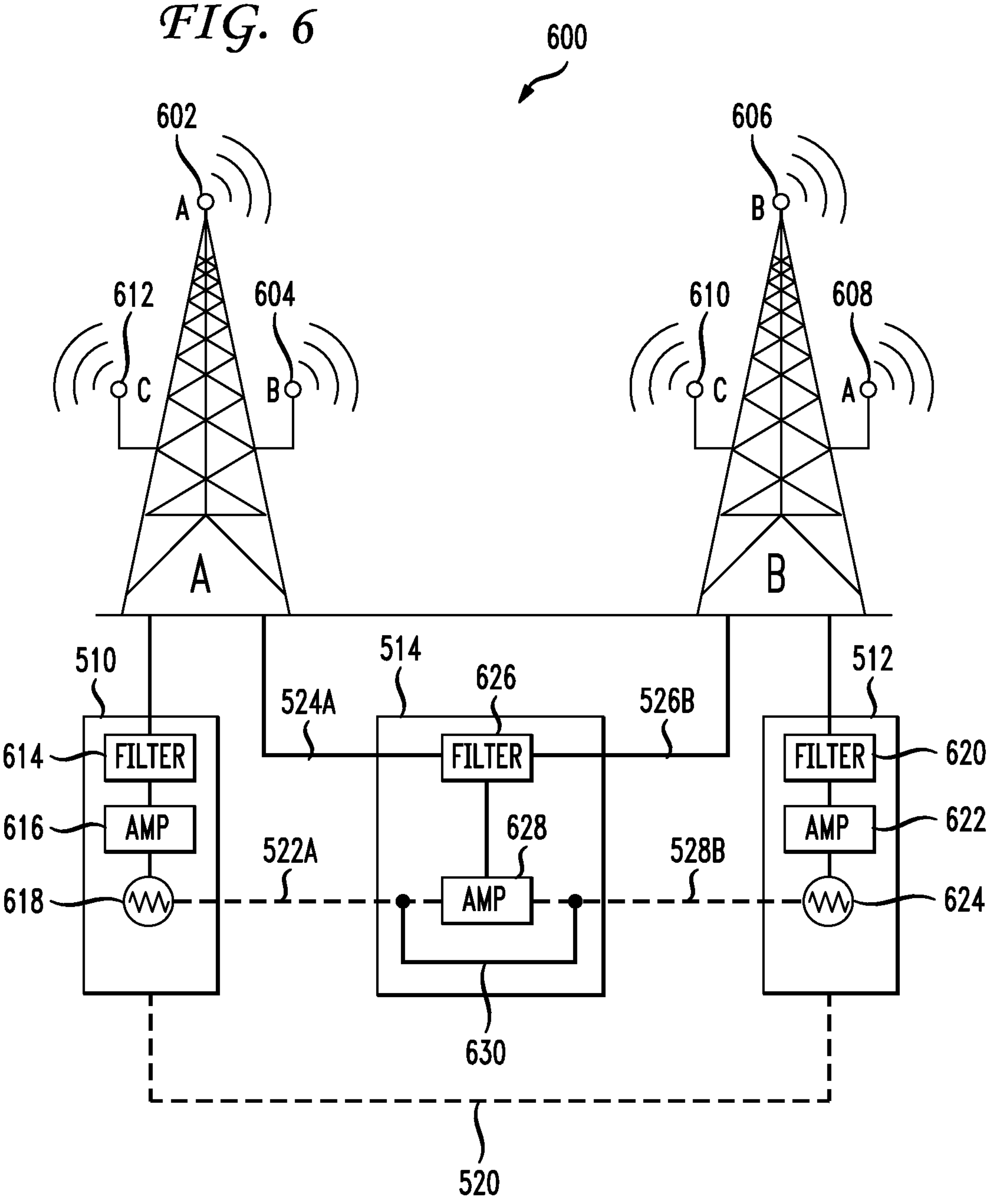
FIG. 6 illustrates an example transmitter tower configuration.

FIG. 6 illustrates one implementation of this approach with more specific details of the control units 510, 512, and 514 and supplemental antennas on the towers. This figure shall be discussed with reference to the coverage hole 506 around tower B. In one aspect, a device 518 at location G needs to detect channel A which has a weak signal at this location. First, FIG. 6 illustrates an additional antenna 608 on tower B. The primary antenna 606 transmits the signal for channel B as generated by its control unit 512. Control unit 514 receives channel A via a communication link 522A. The main version of channel A is broadcast via an antenna 602 on tower A. Control unit 514 can receive channel A, amplify the signal 628, filter the signal 626 and communicate the filtered signal through feedline 526B to supplemental antenna 608 at the appropriate power to eliminate coverage hole 506. Respective control units 510 and 512 generate the signals radiated from the respective antennas 602, 606 on tower A and tower B.

The control unit 510 for primary antenna 602 includes a signal generator 618, an amplifier 616, and a transmit filter 614. The feed line can be the original source of the broadcast signal A, but can mix a received additional auxiliary signal B from control unit 514 before passing signals A and B through the amplifier 616 and the filter 614. Control unit 512 includes a filter 620, amplifier 622 and signal generator 624 and performs similar functionality with different signals. The control unit 514 also includes a filter 626 and an amplifier 628. The control unit 514 receives a signal from control unit 510 via line 522A or from control unit 512 via line 528B. The amplifier 628 and filter 626 of control unit 514 can process the signals and transmit them either via feedline 524A or 526B to the appropriate auxiliary antenna 604, 608.

In an alternate aspect, the control unit 512 directly receives a signal from control unit 510 for processing and transmission through antenna 608 on tower B. To accomplish this aspect, the control unit 514 includes a pass-through link 630 which bypasses the filter 626 and amplifier 628 for a direct path from one control unit to the other. This approach can be extended to multiple signals, such as a primary signal A, an auxiliary signal B in a lower adjacent frequency band, and an auxiliary signal C in a higher adjacent frequency band. Communication link 520 also represents a wireless interface between control units 512 and 510 for communicating the appropriate signal that will be broadcast as an auxiliary signal. Communication links 522A and 528B can also represent a wireless communication channel between control units 510, 512 and control unit 514.

Figure 7:
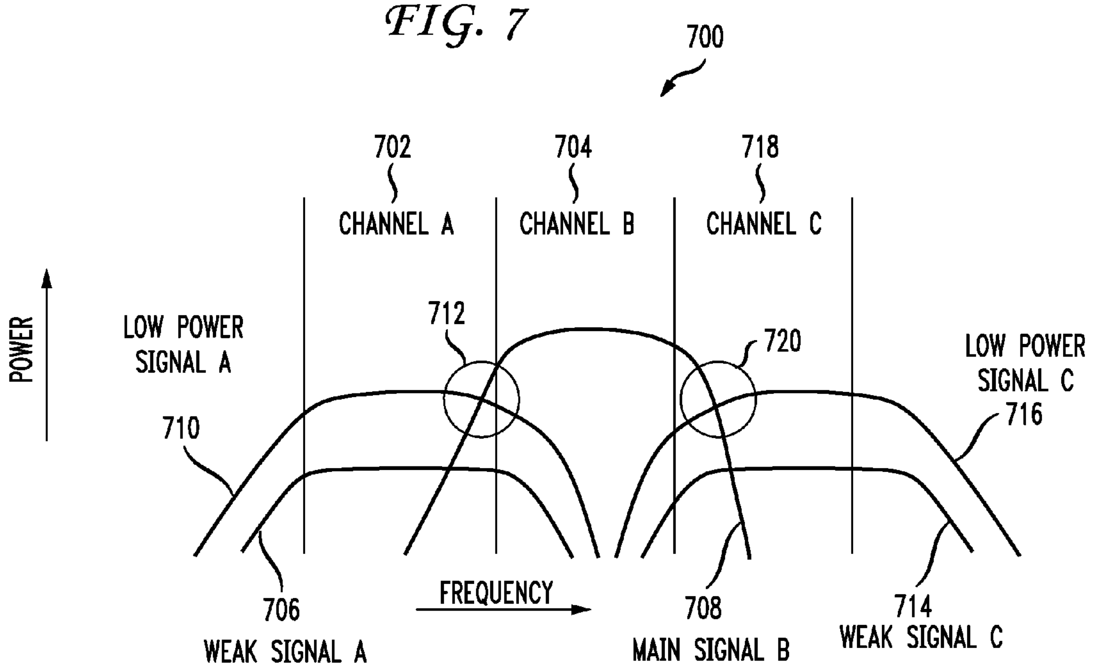
FIG. 7 illustrates an example of adjacent channels A, B and C and transmission signal strengths.

FIG. 7 illustrates the frequency versus power relationship 700 between channel A 702 and channel B 704 in which channel B is stronger relative to channel A. In coverage hole 506, tower B can include another antenna 608 which receives and radiates channel A typically at a lower power 710. In some portions of a coverage hole, the weaker main transmitter signal is not detectable at all, so a receiver only receives the nearby auxiliary signal. As the receiver moves toward the boundary of the auxiliary transmitter, a simulcast effect occurs in which the receiver receives both the weaker main transmitter signal and the auxiliary signal. In these cases, the original weaker signal channel A is boosted by the auxiliary transmitted channel A to a level just strong enough 712 to be detectable within the coverage hole 506. Thus, the first aspect involves deploying an additional antenna on tower B which functions as described above. In a similar manner, tower A can have an additional antenna 604 deployed which transmits the received channel B signal via control unit 514 to provide coverage in the B coverage hole 508. Tower A can include a second additional antenna 612 broadcasting on a channel C. Similarly, tower B can include a second additional antenna 610 broadcasting on channel C. The multiple additional antennas can be directed to coverage holes of different sizes and locations. For example, on tower B transmitting channel B, having two auxiliary antennas can limit the need for a guard band between channel B and channel A and a guard band between channel B and channel C. The coverage hole for channel A around tower B may be different in configuration from the coverage hole around tower B for channel C. This is because channel A and channel C will likely have different propagation characteristics and power from their transmission towers. In one case, the system combines the two approaches of broadcasting the main signal and auxiliary signals through a single antenna (antenna 606 in the case of tower B) as well as broadcasting the main signal through a main antenna and the auxiliary signal through an auxiliary antenna. This can be advantageous to address coverage holes of a particular shape, location, or size.

In one example with respect to a second auxiliary channel C that is broadcast via a second supplemental antenna 612 or 610, the system receives the second supplemental signal that relates to a second remote signal broadcast from a second remote antenna through a radio control unit. With reference to FIG. 6, a separate tower C (not shown) would transmit from the second remote antenna. The system processes the second supplemental signal with the local signal and broadcasts the local signal and the second supplemental signal either via the common antenna 602 or via the separate antenna 612. The second supplemental signal is broadcast at sufficient power to overcome interference in a coverage hole of the second remote signal caused by the local signal, the coverage hole being around the common antenna.

The power levels chosen for the supplementary lower power signal 710 can be static or dynamic. While they are typically static and determined based on known power levels of the main signal A and other factors, in one aspect, the system can receive other data such as reception at various devices in a coverage hole, weather conditions, transmission conditions for channel A and channel B, and utilize that data to vary the signal power for signal 710. For example, if the system receives data that channel B is down for some reason, then it would be a waste of energy to continue to even transmit the low power signal 710. In this case, the auxiliary signal would cease being transmitted until the condition returned back to normal with the transmission of channel B. Ionospheric or atmospheric conditions may also cause variations in the relative signal strengths which can cause the system to implement dynamic adjustments to the auxiliary signal 710.

FIG. 6 illustrates a first approach to using separate auxiliary or supplementary antennas 604, 608, 610, 612 on a tower. A second approach includes injecting auxiliary signals directly into the main transmitter signal, which would require no additional broadcast hardware and may be the most cost-effective implementation of what is disclosed herein. In this case, antennas 604, 608, 610, 612 are not added to the respective tower A or B. The control unit 510 (when addressing the B coverage hole around tower A) will receive channel B via a control unit 514 or directly via communication link 520 and cause channel B to be transmitted with channel A via antenna 602. In this manner, assuming that the physical characteristics of the antenna 602 enable such transmission, both channel A at its signal strength and channel B (at a weaker signal strength) can be transmitted via the same antenna. The same result occurs however in that the coverage area 508 still includes the supplementary lower power signal 710 which positively mixes with the main signal A 706 such that the relative weakness of the main signal is overcome thus rendering the signal detectable. In this case, both the channel A signal generated by generator 618 and the auxiliary channel B are mixed and amplified by the same amplifier 616. The filter 614 may be configured to filter much of the frequencies of auxiliary channel B. This is because channel B is out-of-band with respect to channel A and the filter is designed to roll-off or suppress the frequencies that are outside of the pass-band. Thus, there may be a need to actually increase the amplification of auxiliary channel B to arrive at the desired transmit power for channel be from antenna 602. In one aspect, to save energy costs, filter 614 may be modified or replace to reduce the filtering affect for the frequencies associated with the auxiliary channel B. Those of skill in the art will understand the balancing of costs between increased energy to boost the auxiliary channel B due to the characteristics of filter 614 and the cost of modifying or replacing the filter 614.

Using the injection approach set forth above, the same antennas broadcast both the main signal and the auxiliary signal and correspondingly benefit from the same antenna pattern. However, in other aspects, the system can employ beam steering to change a direction of a main lobe of a transmission pattern. The system can use beam steering or other approaches to tailor the main and/or the auxiliary signal to the shape of the coverage hole or dead zone based on an analysis of the shape, size, and location of the dead zone.

The disclosed solution addresses the near/far problem described herein. The solution allows the deployment of transmitters or the transmission of signals on adjacent channels without a guard band. In the case of television receivers, adjacent channel rejection is typically on the order of 30 dB or more. By co-locating a lower power transmitter with the offending transmitter, sufficient signal strength can be provided in the desired channel to overcome the offending adjacent channel signal. Co-location generally means that both transmitters are in the same location, such as on the same transmitter tower or structure, even if they are not in the exact same position on the tower. The lower power signal 710 only needs to overcome the difference between the adjacent channel signal and the matching signal from the remote primary transmitter. Therefore, the power level for signal 710 can be much lower than the power level of the signal propagated by the station's primary transmitter. One way to prevent interference between the main and supplementary transmitters is to build them as a single frequency network. The auxiliary transmitter output can be 100 to 1000 times lower than the primary transmitter (30 dB-10 dB capture ratio), dependent on the situation. Output can also be higher or lower than that range. While in most implementations, the output of the lower power transmission is fixed, in other aspects the lower power transmission is adjusted based on feedback or adjusted relative to the output power of the offending and/or primary transmitter.

This technique allows for closer packing of broadcast stations and placement of more stations in each market. This technique can also allow the movement of broadcast stations into a narrow block of spectrum to free up spectrum space for auction for mobile broadband or other services. For example, instead of spreading out television broadcast channels on channels 2, 4, 6, 8 and 10, using this technique, these channels can be compacted to 1, 2, 3, 4 and 5. This technique can also be used to improve receiver reception in areas near the auxiliary transmitter that would normally have suffered from shadowing from the main transmitter. This technique is not limited to improving reception due to interference from another transmitter. This approach can be used to improve reception from any sort of localized interference and can further provide broadcast services to rural or small target coverage especially in cases of co-channel operation from an adjacent market. In short, this disclosure can be useful in almost all spectrum shortage situations to enable more efficient use of the spectrum.

In addition to addressing the issue of coverage holes, the principles disclosed herein can also apply to border or fringe areas. Consider the example of two separate cities located 100 miles apart. Typically the FCC will not reassign the same channel or adjacent channel in both cities because of interference effects from fringe reception. If one city has a transmitter on channel 20, the other city located near the coverage boundary of that transmitter is precluded from having a transmitter on channel 20 or channels 19 and 21 because the relative strength of the two signals in the coverage boundary area causes interference and thus difficulties in reception. However, an auxiliary or supplemental transmitter at lower power can overcome this problem and, in effect, extend the channel 20 coverage area to the fringe market. As with the other embodiments discussed herein, the auxiliary transmitter may transmit via the same antenna as a main transmitter or may transmit via a separate antenna. This approach can be helpful for specific communities of interest on the fringe of a particular coverage area and prevent channel interference in remote areas. Beam steering may also be applied according to known principles in this example to focus the supplemental transmitted signal to the particular coverage area.

The power, positioning, height, and other variables related to the auxiliary transmitters can be determined based on the type of antenna, power of the main transmitter, the power level required for the supplemental signal, and/or other relevant factors. In another aspect, the system inserts or injects the auxiliary signal in the main signal and processes the auxiliary signal through the same power amplifier, feedline and antenna as the main signal. This approach can bring high performance at a low cost, depending on the frequency characteristics and capabilities of the antenna according to principles known in the art.

In order to achieve positive interaction between the weak main signal A 706 and the supplementary lower power signal 710 as shown in FIG. 7, the system receives a feed of the original channel through a cable as is shown in FIG. 6 or through another communication mechanism such as a microwave transmission, satellite, etc. Referring again to FIG. 6, the system cannot simply rebroadcast weaker signal 706 (weak main signal transmitted from tower A) received directly over the air from the tower B because propagation delays or differences in the transmission paths lead to phase issues. In order to address this issue, the signal 706 and auxiliary signal 710 are almost phase-locked with each other to eliminate interference. Preferably, the signals are not fully phase-locked or linked together because, depending on the geography of the coverage hole, the two signals would reinforce each other when in phase and cancel each other out when out of phase. Therefore, it is preferable to incorporate a slight offset to eliminate this issue. If the coverage hole does not have characteristics that would cause the signals 708, 710 to either reinforce or cancel either other but rather solely reinforce each other, then the system can be designed to fully phase-lock the signals, which can reduce the necessary power to achieve the desired detectability by a receiver in the coverage hole. The system can apply the same approach to an adjacent channel C 718 on the other side of channel B by applying a lower power signal C 716 to boost the weak main signal C 714 in order to overcome interference from adjacent channel signal B 708. Feature 720 represents a point where the lower power signal 716 is strong enough to be detected in the coverage hole. Typically, where there are first and second supplementary signals that are broadcast from a location, such as a channel A and channel C with the main channel B, the supplemental channels are both adjacent to the main channel. This is the configuration shown in FIG. 7.

The arrangement shown in FIG. 6 with supplementary signals being transmitted from supplementary antennas causes three different types of regions for devices to receive the signal. For example, device 518 in region 506 of FIG. 5, when nearest to tower B, when tuning to channel A will first directly receive the signal 710 (shown in FIG. 7) since that signal has a greater strength than the weaker main signal A 706. As the device 518 moves farther away from tower B and near the border 506 of the A coverage hole, the signal detected by the device 518 will include the beneficial interaction of both the main signal A 706 and the supplementary lower power signal 710. As the device 518 exits the coverage hole 506, the detected signal will simply be the main signal A 706 which is now stronger since the user is closer to the tower A or outside of the range of the stronger signals from tower B.

Figure 8:
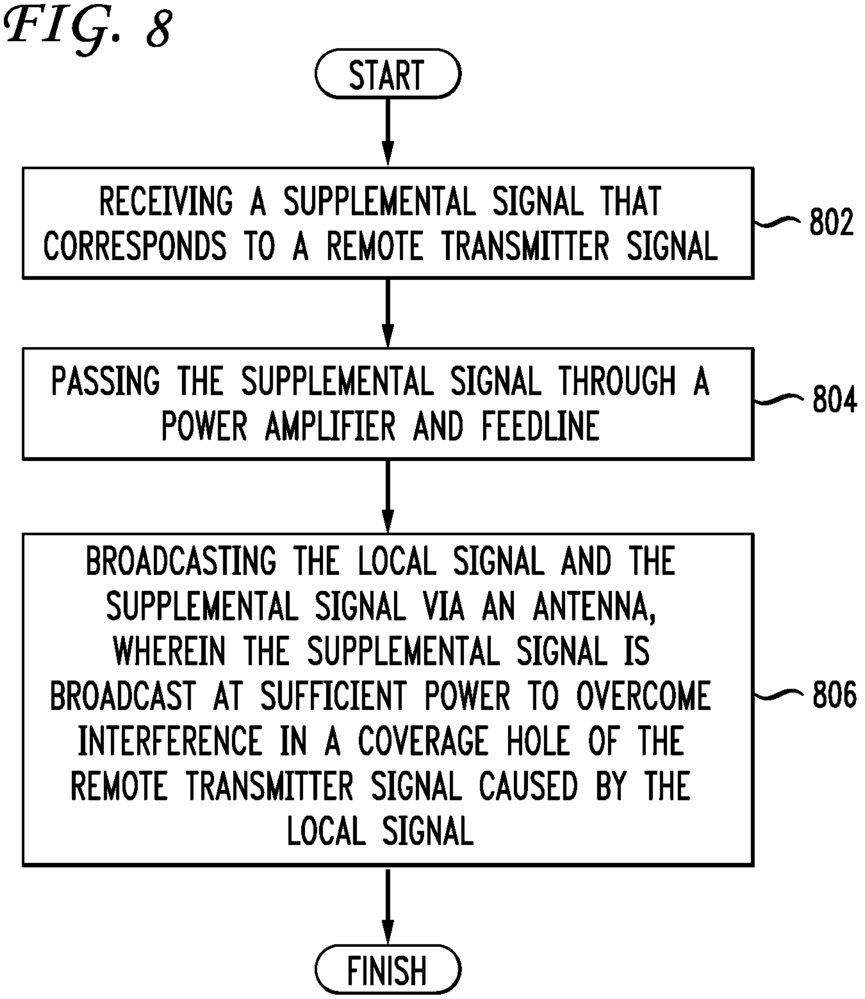
FIG. 8 illustrates an example method embodiment.
Figure 9:
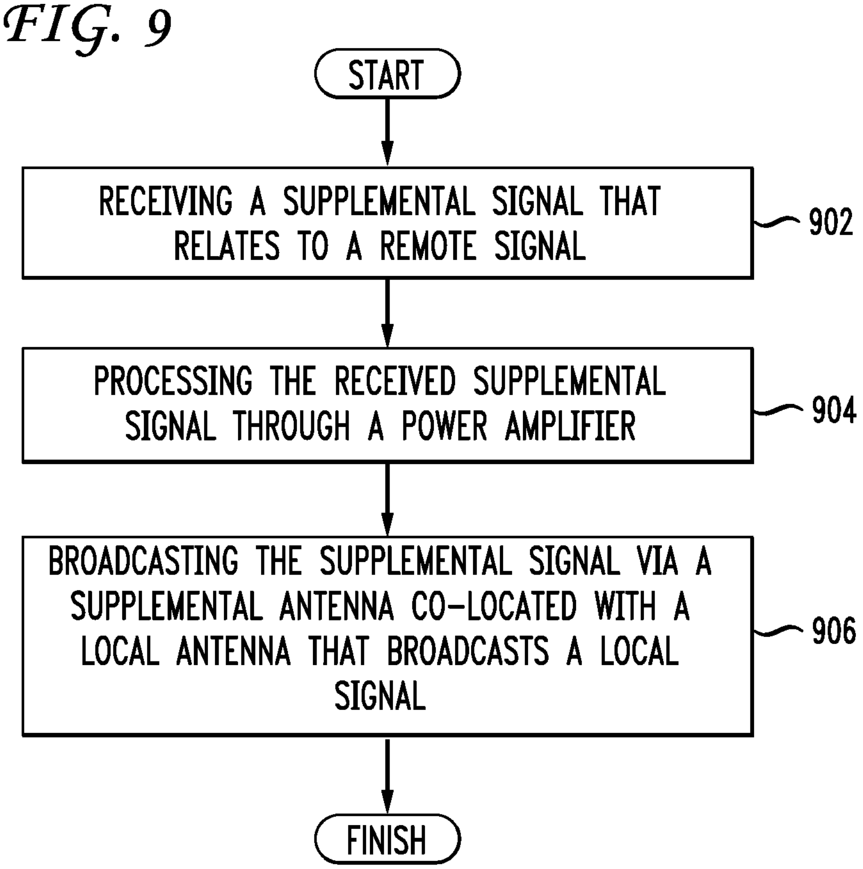
FIG. 9 illustrates an example method embodiment.

Having disclosed some basic system components, the disclosure now turns to the exemplary method embodiment shown in FIG. 8. This embodiment focuses on the method of applying the principles disclosed herein for transmitted a main and supplementary signal from the same common physical antenna. FIG. 9 discloses the embodiment in which the supplemental signal is transmitted from a physically separate antenna from main signal at the same location. For the sake of clarity, the method is discussed in terms of an exemplary system such as is shown in FIGS. 1, 5 and 6 configured to practice the method.

The system can include a radio control unit or module that controls the various amplifiers and filters to transmit via an antenna the main and supplemental signals. Both signals can be processed by the same amplifier and filter or separate amplifiers and filters. The system receives a supplemental signal that corresponds to a remote transmitter signal (802). FIGS. 6 and 7 provide an example of a supplemental antenna 608 with a first main antenna 606 transmitting a first signal 708. The supplemental antenna transmits a supplemental signal 710 which may or may not be adjacent to the first signal 708. The second signal 706 is the weak main signal A transmitted from the second main transmitter 602 (tower A) at a remote location from transmitter 606 (tower B). The system next passes the signals (main and auxiliary) through a power amplifier and feedline as a local signal (804). For example, amplifier 616, filter 614 and the feedline to tower A may process both channel A and the auxiliary channel B received from control module 512. The system broadcasts the supplemental signal via the same antenna as the first signal and at a sufficient power to overcome interference in a coverage hole of the second signal caused by the first signal (806). As noted above, the signal 706 may be fully phase-locked with the main signal 706 or slightly offset. An additional or secondary supplemental signal can also be broadcast such that lower power signals are broadcast at frequencies both higher and lower than the main signal for a particular location. Where multiple auxiliary signals are broadcast with a main signal at any particular location and from a common antenna, each auxiliary signal can be treated independently with respect to whether they are combined at an amplifier, combined at the filter, or separately inserted into the common antenna. For example, a first supplemental signal may be combined with a main signal at the amplifier while a second supplemental signal may be combined following the amplifier stage to the existing main signal and first supplemental signal.

With the main signal and the supplemental signal both being transmitted from the same antenna, various ways of processing these signals can be employed. For example, lower level versions of these signals can be combined prior to amplification in the units 618 and 624. Those of skill in the art will understand how these signals would be mixed and processed prior to insertion into a common amplifier 616 or 622. In another aspect, the main signal and the supplemental signal may have different transmitters and different amplifiers 616 and 628 and combined at a power amplifier output stage. Thus, in the example of transmitting from antenna 602 on tower A, the supplemental signal on line 522A would be combined with the main signal at a point either at the output of amplifier 616 or at a later stage (via common filter processing or separate filter processing) and fed to the antenna 602. In this respect, various modules or control units are discussed which can be combined in different ways to perform particular functions within the system. For example, where a common antenna transmits the supplemental signal and the main signal, a module for processing these signals may include the amplifier 628 of control unit 514, the amplifier 616 from control unit 510 and a common filter 614 which would receive two amplified signals and filter them for communication to the antenna 602.

The transmitters can transmit radio signals such as analog television signals, digital television signals, audio signals (e.g. AM and FM radio signals), and/or data signals. In some cases, multiple streams of information are multiplexed into the same signal. The transmitter can include or be associated with a receiver that communicates using a signal associated with the second signal. This can be useful in HAM radio transmissions, cellular phone communications, or any other two-way radio based communications, for example. The transmitted signals can be part of a broadcast.

In another aspect is discussed with reference to FIGS. 5 and 6 and focusing on the A coverage hole 506. A system 514 processes a supplemental signal by first receiving a supplemental signal A from tower A that matches or corresponds to the signal transmitted from antenna 602 on tower A. The system 514 then injects or inserts the supplemental signal through a same power amplifier 512 and feedline as a local signal B transmitted via antenna 606 on tower B and adjacent to the supplemental signal. This communication link is shown in FIGS. 5 and 6 as a dotted line between control module 514 and modules 510/512. The system 514/512 broadcasts the local signal and the supplemental signal via the antenna 606. The supplemental signal is broadcast at sufficient power to overcome interference in a coverage hole 506 of the remote transmitter signal (signal A from tower A) caused by the local signal (signal B from tower B). A symmetric approach can be applied to manage the B coverage hole with the signal being communicated from tower B through control module 514 to control module 510 for transmission through antenna 602.

FIG. 9 illustrates a method embodiment applied to the structure and signals shown in FIGS. 6 and 7 using supplementary antenna 608. A method causes a device or system to transmit a supplemental signal 710. The method includes receiving a supplemental signal that relates to a remote signal A (902). Control unit 514 or 512 receives the signal. The method further includes processing the supplemental signal through a power amplifier (904) and broadcasting the supplemental signal via a supplemental antenna 608 co-located with a local antenna 606 that broadcasts a local signal (906). The supplemental signal 710 is broadcast at sufficient power to overcome interference in a coverage hole of the remote transmitter signal 706 caused by the local signal 708. The coverage hole is typically defined as a geographic region around the location of the local antenna where the strength of the local signal is strong enough to prevent detection of the remote signal using conventional receiving equipment. An additional or secondary supplemental signal can also be broadcast such that lower power signals are broadcast at frequencies both higher and lower than the main signal for a particular location. Of course, receiving equipment of enhanced selectivity and sensitivity is more capable of discriminating even faint signals in the face of overpowering interference, but this approach allows conventional receiving equipment, such as standard television antennas, FM radios in cars, cellular phone antennas, and so forth, to receive a signal in a coverage hole without the extra cost and burden of receiver modification.

The system can further receive, via a feedback module, feedback from a receiver station 516, 518 in the coverage hole and adjust, via an adjustment module, at least one of power, frequency, and directionality of the supplemental antenna based on the feedback. The system can perform these functions via a feedback module that can receive data from any number of sources such as receivers in various regions, weather data, performance data of transmitters and signal strengths, etc. An adjustment module utilizes the feedback information to make appropriate modifications to the supplemental transmitter. The system can disable the supplemental transmitter based on the feedback. In some cases, the supplemental transmitter transmits in the range of 100 to 1,000 times less power than the first main transmitter. The feedback module and adjustment module can include hardware components of the device of FIG. 1 and any other necessary components of the radio control units disclosed herein.

The disclosure will next turn to a general discussion of a general purpose computer system which can be used as part of any of the particular approaches described above. In some instances, the amplifiers, filters and other known equipment used to generate, amplify and radiate signals into the air interface, will not use general purpose computers but may use other known hardware elements or may have integrated therein components such as processors and memory. All such combinations of radio equipment and computer components are considered within the scope of this disclosure. With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. These and other modules can be configured to control the processor 120 to perform various actions. Other system memory 130 may be available for use as well. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a tangible and/or intangible computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. The input device 190 may be used by the presenter to indicate the beginning of a speech search query. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Generally speaking, such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Embodiments within the scope of the present disclosure may also include tangible computer-readable storage media for carrying or having computer-executable instructions or data structures stored thereon. Such computer-readable storage media can be any available media that can be accessed by a general purpose or special purpose computer, including the functional design of any special purpose processor as discussed above. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

I claim:

1. A system comprising:
- a radio control unit that receives a supplemental signal associated with a remote signal broadcast from a remote antenna; and
- a supplemental antenna co-located with a main antenna transmitting a main signal, wherein:
  - the main signal creates a coverage hole in the remote signal; and
  - the radio control unit transmits the supplemental signal to the supplemental antenna such that the supplemental antenna radiates the supplemental signal at a sufficient power to overcome interference in the coverage hole.

2. The system of claim 1, wherein the radio control unit further comprises an amplifier and filter.

3. The system of claim 1, further comprising:
- a feedback module that receives feedback from a receiver station in the coverage hole; and
- an adjustment module that adjusts one of power, frequency, and directionality of the supplemental signal based on the feedback.

4. The system of claim 1, wherein the supplemental antenna is physically separate from the main antenna.

5. The system of claim 1, wherein the supplemental antenna transmits at a lower power relative to the main antenna.

6. The system of claim 1, wherein the radio control unit is separate from a main radio control unit that generates and transmits the main signal.

7. The system of claim 6, wherein the supplemental signal is one of an analog television signal, digital television signal, audio signal, and data signal.

8. The system of claim 1, wherein the radio control unit receives the supplemental signal from a wireless communication channel that differs from the communication channel associated with broadcast of the remote signal from the remote antenna.

9. A method comprising:
- receiving a supplemental signal that relates to a remote signal;
- processing the supplemental signal through a power amplifier; and
- broadcasting the supplemental signal via a supplemental antenna at a location of a separate local antenna that broadcasts a local signal, wherein:
  - the local signal creates a coverage hole in the remote signal; and the supplemental signal is broadcast at a sufficient power to overcome interference in the coverage hole in a geographic region around the location.

10. A system comprising:

a radio control unit that receives a supplemental signal that corresponds to a remote signal broadcast from a remote antenna; and a module that combines the supplemental signal with a main signal, to yield a dual signal having both the supplemental signal and the main signal; and a module that broadcasts the dual signal via a common antenna, wherein:

the main signal creates a coverage hole in the remote signal; and the supplemental signal of the dual signal is broadcast at a sufficient power to overcome interference in the coverage hole in a geographic region around the common antenna.

11. The system of claim 10, wherein the module that combines the supplemental signal with a main signal combines lower level versions of the supplemental signal and the main signal at a common amplifier.

12. The system of claim 10, wherein the module that combines the supplemental signal with a main signal further processes the supplemental signal and the main signal through a transmit filter.

13. The system of claim 12, wherein the module that combines the supplemental signal with a main signal further increases a power of the supplemental signal to accommodate out of band roll-off in the transmit filter.

14. A method comprising:

receiving a supplemental signal that relates to a remote signal broadcast from a remote antenna;

combining the supplemental signal with a local signal, to yield a combined signal; and broadcasting the combined signal via a common antenna, wherein:

the local signal creates a coverage hole in the remote signal around the common antenna; and the supplemental signal of the combined signal is broadcast at sufficient power to overcome interference in the coverage hole.

15. The method of claim 14, wherein the supplemental signal and the local signal are in adjacent channels.

16. The method of claim 14, wherein combining the supplemental signal with the local signal occurs prior to a power amplifier stage, and wherein the supplemental signal and the local signal are amplified by the power amplifier.

17. The method of claim 14, wherein combining the supplemental signal with the local signal follows a power amplifier stage in which the supplemental signal and the local signal are amplified by different power amplifiers.

18. The method of claim 17, wherein the supplemental signal is broadcast at a lower power relative to the local signal.

19. The method of claim 14, wherein the local signal and the supplemental signal are slightly out of phase relative to each other.

20. The method of claim 14, the method further comprising:

receiving a second supplemental signal that relates to a second remote signal broadcast from a second remote antenna, wherein the local signal creates a second coverage hole in the second remote signal around the common antenna;

combining the second supplemental signal with the local signal, to yield a second combined signal; and broadcasting the second combined signal via the common antenna, wherein the second supplemental signal of the second combined signal is broadcast at sufficient power to overcome interference in the second coverage hole.

* * * * *